(12) United States Patent
Nagata

(10) Patent No.: US 9,320,582 B2
(45) Date of Patent: Apr. 26, 2016

(54) PRIMATE RESTRAINT DEVICE

(75) Inventor: Ryoichi Nagata, Kagoshima (JP)

(73) Assignee: SHIN NIPPON BIOMEDICAL LABORATORIES, LTD., Kagoshima-shi (JP)

( * ) Notice: Subject to any disclaimer, the term of this patent is extended or adjusted under 35 U.S.C. 154(b) by 0 days.

(21) Appl. No.: 13/389,348

(22) PCT Filed: Aug. 6, 2010

(86) PCT No.: PCT/JP2010/063363
§ 371 (c)(1),
(2), (4) Date: Apr. 10, 2012

(87) PCT Pub. No.: WO2011/016547
PCT Pub. Date: Feb. 10, 2011

(65) Prior Publication Data
US 2012/0186531 A1    Jul. 26, 2012

(30) Foreign Application Priority Data

Aug. 7, 2009 (JP) ................................ 2009-184258

(51) Int. Cl.
| | | |
|---|---|---|
| *A01K 15/04* | (2006.01) | |
| *A01K 1/03* | (2006.01) | |
| *A61D 3/00* | (2006.01) | |
| *A01K 1/06* | (2006.01) | |

(52) U.S. Cl.
CPC . *A61D 3/00* (2013.01); *A01K 1/031* (2013.01); *A01K 1/0613* (2013.01); *A61D 2003/006* (2013.01)

(58) Field of Classification Search
CPC ................ A01K 1/031; A01K 1/0613; A61D 2003/006; A61D 3/00
USPC ......... 119/453, 472, 473, 751, 752, 816, 817, 119/820

IPC ............................................... A01K 15/04,1/08
See application file for complete search history.

(56) References Cited

U.S. PATENT DOCUMENTS 4,770,127 A * 9/1988 Volk ............................... 119/473
4,781,147 A * 11/1988 Delino, Jr. .................... 119/453
(Continued)

FOREIGN PATENT DOCUMENTS

| JP | 7-147862 A | 6/1995 |
|---|---|---|
| JP | 8-24506 B2 | 6/1995 |

(Continued)

OTHER PUBLICATIONS

Nagata, "Improvement of Purchased Monkey Chair for Experiments of Brain Higher Function", Annual Report of the Technical Division of National Institute of Physiological Sciences, No. 10, Oct. 1, 1995, pp. 40-43.(cited in International Search Report dated Oct. 26, 2010.)

(Continued)

*Primary Examiner* — Shadi Baniani
(74) *Attorney, Agent, or Firm* — Westerman, Hattori, Daniels & Adrian, LLP

(57) ABSTRACT

A primate restraint device capable of restricting the movement of a monkey and, particularly, capable of facilitating injection or blood collection. A primate restraint device comprising: a containing body having both side surfaces, a top surface, and a bottom surface; a door provided to the rear surface side of the containing body and capable of opening and closing the rear surface side of the containing body by sliding up and down; and a partition wall which is formed so as to close the inside of the containing body from the front surface side and to be movable forward and backward within the containing body and which is configured to be able to be affixed at a desired position within the containing body. The partition wall has provided therein hind-limb protrusion openings from which the hind limbs of the contained primate are caused to protrude to the outside.

1 Claim, 3 Drawing Sheets

(56) References Cited

U.S. PATENT DOCUMENTS

| | | | | |
|---|---|---|---|---|
| 5,571,241 | A | * | 11/1996 | Nagata .......................... 119/473 |
| 7,162,977 | B1 | * | 1/2007 | Charvat ........................ 119/751 |
| 7,806,088 | B2 | * | 10/2010 | Osada et al. .................. 119/752 |
| 2009/0090303 | A1 | | 4/2009 | Osada et al. |

FOREIGN PATENT DOCUMENTS

| | | | | |
|---|---|---|---|---|
| JP | 11-9129 | A | | 1/1999 |
| JP | 11009129 | A * | 1/1999 | ............. A01K 15/04 |
| WO | 2007/034588 | A1 | | 3/2007 |

OTHER PUBLICATIONS

Togawa et al., "Prototype of Monkey Chair for experiments of Brain Higher Function", Annual Report of the Technical Division of National Institute for Physiological Sciences, No. 9, Okazaki Kokuritsu Kyodo Kenkyu Kiko Seirigaku Kenkyusho Gijutsuka, 01, Sep. 1, 1994, pp. 50-53.(cited in International Search Report dated Oct. 26, 2010.)

Kamimura, "About Training as to Treatment of Primates in the Primate Research Institute, Kyoto University", Japanese Association for Experimental Animal Technologists Hokkaido Shibu Kaishi, No. 21, Japanese Association for Experimental Animal Technologists Hokkaido Shibu, Sep. 1, 1997, pp. 23-26.(cited in International Search Report dated Oct. 26, 2010.)

International Search Report of PCT/JP2010/063363, mailing date of Oct. 26, 2010.

International Preliminary Report on Patentability (Form PCT/IB/373) of International Application No. PCT/JP2010/063363 mailed Mar. 13, 2012 with Form PCT/ISA/237.

* cited by examiner

PRIMATE RESTRAINT DEVICE

TECHNICAL FIELD

The present invention relates to a restraint device used in an experiment for examining efficacy of a pharmaceutical product or similar by using primates. The present invention relates in particular to a restraint device which restricts the movement of primates while conducting injections or blood collection.

BACKGROUND ART

In the development of pharmaceutical products to be used in medical examination of human beings or treatment of diseases, in order to examine in advance how the drug influences human bodies, the drug needs to be administered to animals to confirm the efficacy.

As such, laboratory animals, mice, rats, dogs, rabbits, monkeys and many other animals are used. However, in order to examine efficacy of the drug to be administered to a human being most accurately, the use of primates (hereinafter referred to as "monkeys") is optimal.

In order to perform oral administration, transnasal intragastric administration, or intravenous injections of drugs to a monkey, to collect blood therefrom, to examine the state of pupils thereof, or to hold the head thereof in case of need, it is necessary to restrain the monkey so that the monkey cannot move freely. Thus, as a restraint device which restrains the movement of the monkey and facilitates work, a restraint device as shown in Patent Document 1 has been proposed.

PRIOR ART

Patent Document

Patent Document 1: JP 08-24506 B

SUMMARY OF INVENTION

Problems to be Solved by the Invention

With regard to the above-described conventional restraint device, attention has been paid only to restricting the movement of a monkey, and consideration has not been given to the treatment to be performed thereafter. For example, no particular consideration has been given to convenience during injection or blood collection.

Thus, the objective of the present invention is to provide a primate restraint device which can restrict the movement of a monkey while facilitating injection or blood collection.

Means to Solve the Problem

The present invention was made to solve the above-mentioned problem and is characterized as follows.

The primate restraint device according to the present invention has a containing body having both side surfaces, a top surface, and a bottom surface; a door provided on the rear surface side of the containing body and capable of opening and closing the rear surface side of the containing body by sliding up and down; and a partition wall formed so as to close the inside of the containing body from the front surface side and to be movable forward and backward within the containing body and configured to be able to be fixed at a desired position within the containing body; and a hind-limb protrusion opening through which a hind limb of a contained primate is protruded outside is provided in the partition wall.

Here, the "front surface" in the present invention refers to the face near to a worker facing the restraint device. Further, the "rear surface" refers to the face opposite to the front surface, that is, the face far from the worker facing the restraint device.

Further, the "containing body" has wall surfaces, that is, both side surfaces, the top surface, and the bottom surface. In other words, in the basic mode, the containing body is formed in a substantial box shape with the front surface and the rear surface open. However, the containing body according to the present invention is not limited to the mode that has the front surface and the rear surface completely open. That is, it is only necessary that the rear surface side is capable of being open to such a degree that it can be used at least as an entrance for a monkey. Moreover, the front surface side is preferably open, considering ease of work and the like, but, as the embodiment of the present invention, is not limited to the open mode. For example, a mode in which part of the front surface side or the rear surface side is not open by providing a member for reinforcing the structure of the containing body or similar on the front surface side or the rear surface side is possible.

Moreover, the "door" is provided on the rear surface side of the containing body is capable of opening and closing the rear surface side of the containing body by sliding up and down. That is, by opening this door, a monkey can be contained from the rear surface side of the containing body. Further, by closing the door, the contained monkey can be locked up within the containing body.

The "partition wall" is formed movably forward and backward within the containing body while closing the inside of the containing body from the front surface side. Further, this partition wall can be fixed at a desired position within the containing body. By forming the partition wall as above, this partition wall can be moved forward and backward within the containing body and limit the range of a contained monkey to move. Specifically, by moving the partition wall to the rear surface side after the monkey is contained, the contained space of the monkey in the containing body is narrowed and the movement of the monkey can be restricted. Further, since this partition wall can be fixed at a desired position within the containing body, it can be fixed in a state wherein the movement of the monkey is restricted. It is only necessary that the fixation of the partition mentioned here can at least obstruct movement of the partition wall in a direction that enlarges the contained space of the monkey and the movement of the partition wall in a direction to narrow the contained space of the monkey, and that these fixations may be made freely. Specific means for fixing the partition wall may include arbitrary means such as a known latch structure, for example.

Further, the "hind-limb protrusion opening" is provided in the partition wall and the hind limb of the contained primate is protruded to the outside through this. For example, two hind-limb protrusion openings can be provided as two openings provided on the right and the left at the lower part of the partition wall. Moreover, not limited to such a mode, only one opening may be provided. In order to facilitate injection or blood collection, the hind-limb protrusion opening preferably has a diameter through which at least the femora of the monkey can pass.

EFFECT OF INVENTION

The present invention is as described above and can restrict the movement of a monkey by moving and fixing the partition wall. Furthermore, since the hind-limb protrusion opening through which the hind limb of the contained monkey is protruded to the outside are provided, it has an advantage in that by taking the hind limb of the monkey out of the hind-limb protrusion opening and grasping it, injection or blood collection can be performed safely and easily.

MODE FOR CARRYING OUT THE INVENTION

An embodiment of the present invention will be described by referring to FIGS. 1 to 3.

(Restraint Device 10)

Figure 1:
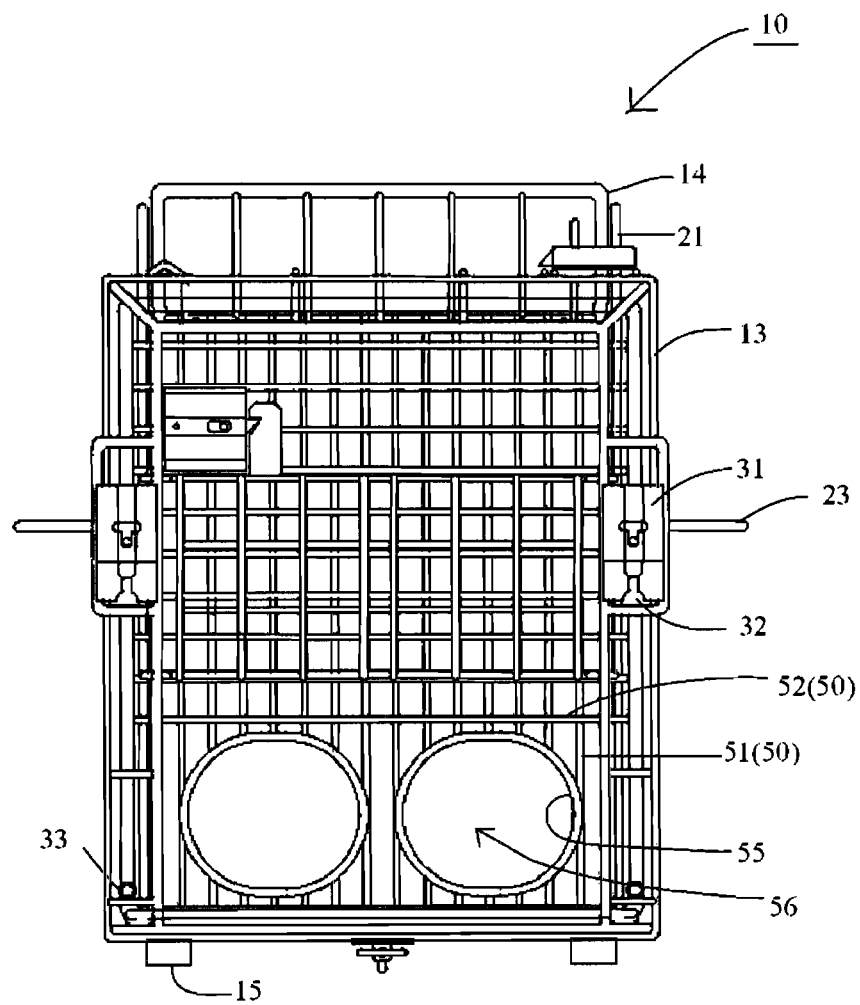
FIG. 1 is a front view of a restraint device, which is an embodiment of the present invention.
Figure 2:
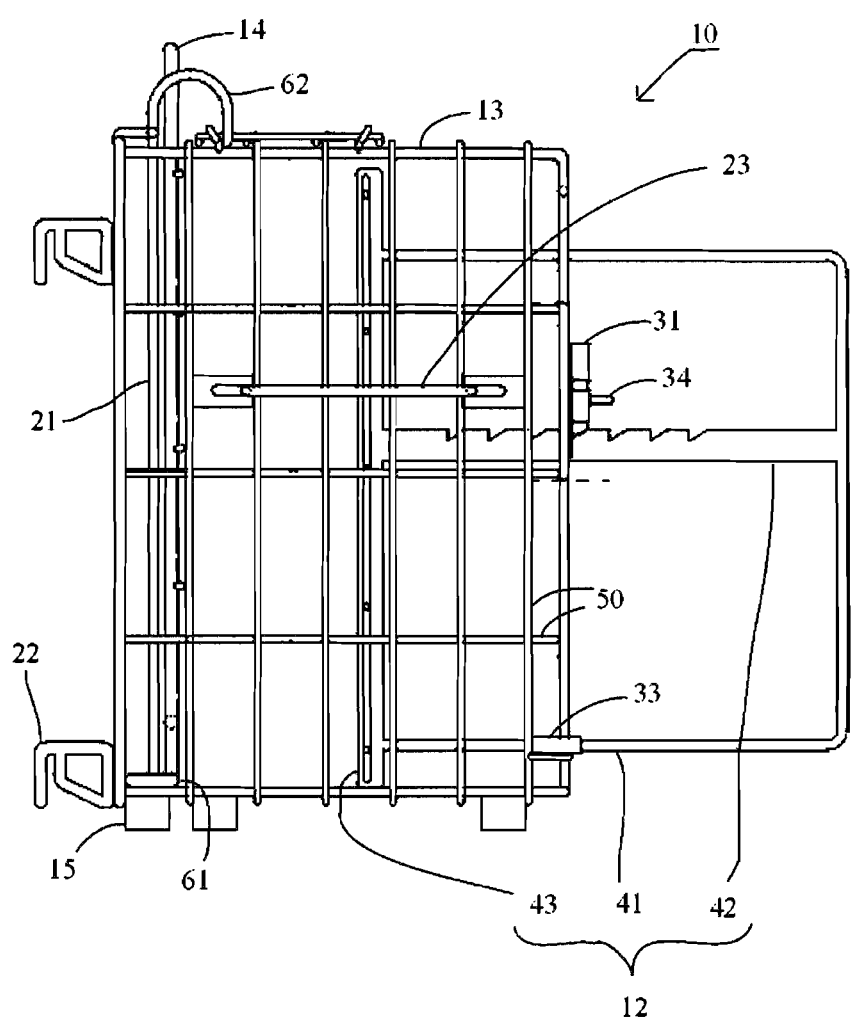
FIG. 2 is a side view of a restraint device, which is an embodiment of the present invention.

The restraint device 10 according to this embodiment is, as illustrated in FIG. 2, constituted of the containing body 13, the slide shutter 14, and the sandwiching body 12 as its essential members. Further, as illustrated in FIGS. 1 and 2, the restraint device 10 according to this embodiment forms a box-shaped cage by the containing body 13, the slide shutter 14, and the sandwiching body 12.

(Containing Body 13 and Slide Shutter 14)

As illustrated in FIG. 1, in the containing body 13 are formed its both side surfaces, top surface, and bottom surface by forming the wall surfaces by assembling bar members 50 in a grid pattern, but the front surface and the rear surface are open.

Further, on the rear surface side is provided the slide shutter 14 capable of opening and closing the rear surface side of the containing body 13 by sliding up and down. The upper end of this slide shutter 14 protrudes above the containing body 13 and it is formed so as to be pulled up easily.

This slide shutter 14 closes the rear surface side of the containing body 13 in the state shown in FIGS. 1 and 2, but by pulling it up as described below, the rear surface side of the containing body 13 can be left open. That is, as illustrated in FIG. 2, in the containing body 13, bar-shaped shutter guide members 21 are installed upright corresponding to each of right and left support columns of the slide shutter 14 in parallel with the respective support columns Further, the lower end portion of the slide shutter 14 forms a ring portion 61, and by inserting the shutter guide member 21 through a hole of this ring portion 61, the slide shutter 14 can be made to slide upward along the shutter guide member 21. Moreover, the upper end of the shutter guide member 21 is curved in the inverse U-shape and forms a curved portion 62. Thus, if the ring portion 61 of the slide shutter 14 reaches this curved portion 62 as the result of pulling up the slide shutter 14, the slide shutter 14 can be placed while overlapping with the upper part of the containing body 13 by pulling down the upper part of the slide shutter 14 to the front side. As a result, the rear surface side of the containing body 13 can be kept in an open state, through which work can be performed freely.

It is assumed that this restraint device 10 is to be used mounted on a horizontal bar of a front grid of a cage in which a monkey is kept. Thus hooks 22 are provided at appropriate positions on an upper part and a lower part of the rear surface of the containing body 13. That is, by hooking these hooks 22 on the horizontal bars on the front grid of the cage, the restraint device 10 can be fixed to the cage. Further, since a door as an entrance for a monkey is provided on the front surface of the cage, by fixing the restraint device 10 to the cage and by leaving the door to the cage and the slide shutter 14 open, the inside of the cage links with the inside of the restraint device 10, and the monkey in the cage can move to the restraint device 10.

Figure 3:
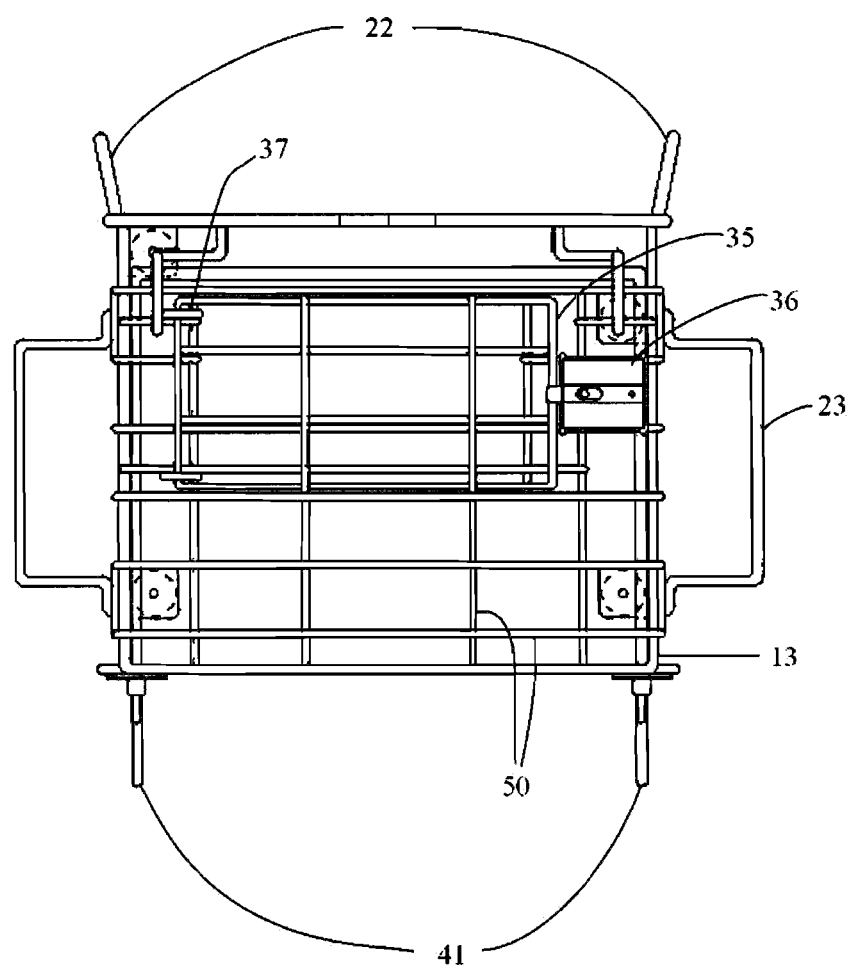
FIG. 3 is a plan view of a restraint device, which is an embodiment of the present invention.

FIG. 3 is a plan view of the restraint device 10 according to this embodiment when seen from above, and as illustrated in this FIG. 3, a top door 35 is provided on the top surface of the containing body 13 in order to approach the monkey contained in the restraint device 10 from above. This top door 35 is capable of being locked by a top-door lock device 36 so that the containing body 13 cannot be easily opened from the inside.

Moreover, transportation handles 23 are provided on both side surfaces of the containing body 13 so that the restraint device 10 can be moved easily.

Furthermore, leg portions 15 for placing the restraint device on the ground stably are provided on the bottom surface of the containing body 13.

(Sandwiching Body 12)

Subsequently, the sandwiching body 12 according to this embodiment will be described.

The sandwiching body 12 is mounted on the containing body 13 for narrowing the contained space of a monkey in the containing body 13 so as to restrict the movement of the monkey. This sandwiching body 12 has a partition wall 43 movable forward and backward within the containing body 13, a sandwiching body handle 41 used for a moving operation of the partition wall 43, and a latch member 42 for fixing the moved partition wall 43 within the containing body 13.

It is possible for the partition wall 43 to move forward and backward within the containing body 13 while closing the inside of the containing body 13 from the front surface side, and, furthermore, fixed to a desired position within the containing body 13. As illustrated in FIG. 2, the partition wall 43 is provided so as to partition the inside of the containing body 13 into the front part and the rear part.

Further, on this partition wall 43, two sandwiching body handles 41, each having a U-shape when viewed from the side extending to the front side, are fixed on right and left when viewed from the front. Further, each of the lower sides of these two sandwiching body handles 41 is supported by a pipe-shaped sandwiching body handle support member 33 provided on the lower part of the containing body 13 for sliding. As a result, by pressing the sandwiching body handles 41 to the rear side, the partition wall 43 can be moved to the rear surface side, whereas by pulling the sandwiching body handles 41 to the front, the partition wall 43 can be moved to the front surface side.

Moreover, between an upper side and a lower side of each of the right and left sandwiching body handles 41, a plate-shaped latch member 42 is provided in parallel with them. Each of the latch members 42 is inserted into a latch member insertion port 32 provided in the containing body 13 so as to guide the front-back movement of the partition wall 43 frontward and backward and also plays a role of fixing the partition wall 43 at a desired position within the containing body 13. That is, in this latch member 42, saw-shaped teeth are formed on the upper face thereof and meshed with a key of a sandwiching body lock device 31 provided on the latch member insertion port 32. As a result, the partition wall 43 can freely move in the direction of the rear surface but cannot freely move in the direction of the front surface. If the partition wall 43 is to be moved in the direction of the front surface, it is only necessary to operate an unlock pin 34 of the sandwiching body lock device 31, and the partition wall 43 can be moved in a state in which the engagement between the teeth of the latch member 42 and the key on the sandwiching body lock device 31 is released.

(Hind-limb Protrusion Opening 56)

The wall surface of the above-described partition wall 43 has a structure in which the bar members 50 are assembled into a grid pattern as illustrated in FIG. 1. That is, partition wall vertical bars 51 bridged vertically and partition wall horizontal bars 52 bridged horizontally are fixed so as to intersect each other and form the wall surface.

Further, in the lower part of this partition wall 43, two substantially elliptical hind-limb protrusion openings 56 are provided on right and left, and each opening edge is reinforced by a ring-shaped member 55.

In this embodiment, when the partition wall 43 is moved so as to restrict the movement of the monkey, the hind limb of the monkey can be protruded through this hind-limb protrusion opening 56. Further, since grid portions other than the portion where the hind-limb protrusion openings 56 are provided are formed with such intervals that the openings are smaller than the hind-limb protrusion openings 56, it is difficult for the monkey to protrude parts of the body other than the hind limb (fore limb, for example) to the outside.

(Use Example)

A specific use example of this restraint device 10 is as follows.

First, the hooks 22 of the restraint device 10 are hooked on a lateral beam of the grid on the front surface of the cage which contains the monkey, and the restraint device 10 is fixed to the cage.

Further, the unlock pin 34 of the sandwiching body lock device 31 is operated so as to release the engagement between the key of the sandwiching body lock device 31 and the teeth of the latch member 42, and the sandwiching body handle 41 is pulled frontward. As a result, the partition wall 43 is moved to the front surface side, and it is ensured that the contained space for the monkey in the containing body 13 is sufficiently wide.

Subsequently, the slide shutter 14 is pulled upward, the upper side of the slide shutter 14 is pulled down to the front, and the slide shutter 14 is placed on the upper part of the containing body 13 in an overlapping manner. As a result, the rear surface side of the containing body 13 is opened. Further, the door of the cage is opened, and the insides of the cage and the restraint device 10 are linked to each other. In this state, the monkey is moved into the restraint device 10.

After the monkey is moved into the restraint device 10, the slide shutter 14 is pulled down, and the door of the cage is closed.

Further, by pressing the sandwiching body handle 41 to the rear side, the partition wall 43 is moved to the rear surface side. As a result, the contained space for the monkey in the containing body 13 is narrowed, and the movement of the monkey can be restricted.

After the movement of the monkey is restricted, the hind limb of the monkey is grasped and pulled out through the hind-limb protrusion opening 56, and treatments such as injection, blood collection and the like are performed.

As described above, according to the restraint device of this embodiment, the hind limb of the monkey can be handled while the movement of the monkey is restricted, and thus, injection or blood collection can be performed safely and easily.

The present invention can be used as a restraint device when testing efficacy of pharmaceutical products and similar by using primates.

The invention claimed is:

1. A primate restraint device for containing a primate, the primate restraint device comprising:
a containing body having both side surfaces, a top surface, and a bottom surface;
a door provided on a rear surface side of said containing body and capable of opening and closing the rear surface side of said containing body by sliding up and down;
a partition wall provided to close an inside area of said containing body from a front surface side and to be movable within said containing body, and configured to be able to be fixed at a desired position within said containing body, such that a movement of the contained primate is restricted, the partition wall being parallel to the rear surface side;
grid portions provided in said partition wall, wherein said grid portions comprise intervals that are smaller than a fore-limb or a hind-limb of the contained primate; and
two hind-limb protrusion openings provided on both a right side and a left side of said partition wall, the hind-limb protrusion openings being parallel to the rear surface side,
wherein said two hind-limb protrusions openings are ring-shaped,
wherein each of said two hind-limb protrusion openings is reinforced by a ring-shaped member,
wherein each of said hind-limb protrusion openings has a diameter larger than said intervals of said grid portions, and
wherein said hind-limb protrusion openings are positioned on a lower part of said partition wall such that, after the movement of the contained primate is restricted, said hind-limb of said contained primate protrudes through said hind-limb protrusion openings.

* * * * *